2/10/87 XR 4,641,432

United States Patent [19]

Kume

[11] Patent Number: 4,641,432

[45] Date of Patent: Feb. 10, 1987

[54] CHAIN SAW GUIDE BAR AND METHOD OF CONSTRUCTION

[75] Inventor: Takeshi Kume, Amagasaki, Japan

[73] Assignee: Suehiro Seiko Kabushiki Kaisha, Miki City, Japan

[21] Appl. No.: 716,329

[22] Filed: Mar. 26, 1985

Related U.S. Application Data

[63] Continuation of Ser. No. 467,156, Feb. 16, 1983, abandoned.

[51] Int. Cl.[4] .............................................. B23D 57/02

[52] U.S. Cl. .............................. 30/383; 219/121 LD; 30/387

[58] Field of Search ................. 30/383, 387, 382, 385, 30/384; 219/121 LD

[56] References Cited

U.S. PATENT DOCUMENTS 2,962,061 11/1960 Nielson ................................ 30/387
3,416,578 12/1968 Irgens .................................... 30/387
3,744,363 7/1973 Espana et al. .......................... 30/383
3,858,321 1/1975 Conaty .................................. 30/383
3,860,784 1/1975 Brown et al. ................ 219/121 LD
3,969,604 7/1976 Baardsen ...................... 219/121 LD
4,138,813 2/1979 Harada et al. .......................... 30/387

FOREIGN PATENT DOCUMENTS 656506 1/1963 Canada ................................. 30/387
871499 5/1971 Canada ................................. 30/387
68193 5/1980 Japan ............................ 219/121 LC

*Primary Examiner*—E. Kazenske
*Assistant Examiner*—Willmon Fridie, Jr.
*Attorney, Agent, or Firm*—Marshall, O'Toole, Gerstein, Murray & Bicknell

[57] ABSTRACT

This disclosure relates to a guide bar for a saw chain which includes a pair of side plates and a center plate laser welded to and between the side plates. The center plate has a peripheral edge which is spaced inwardly from the outer periphery of the side plates so as to form a peripheral guide channel or groove for the chain. The disclosure further relates to a method of making a three-plate guide bar wherein the plates are laser welded together.

4 Claims, 10 Drawing Figures

CHAIN SAW GUIDE BAR AND METHOD OF CONSTRUCTION

This is a continuation, of application Ser. No. 467,156, filed Feb. 16, 1983 now abandoned.

This invention relates to the structure and method of construction of a guide bar for a chain saw.

A well known type of guide bar includes two side plates and a center or sandwich plate between them. The sandwich plate is spaced from the outer edges of the side plates to form a guide groove for a chain saw between the two side plates.

The three plates must be secured together to form a strong assembly, and one means to accomplish this has been to spot weld the plates together. Spot welding requires a weld width of approximately 6 millimeters and a large amount of electric current to obtain a depth of fusion of about 1.6 millimeters. Therefore it is normally used to weld only two plates together. To spot three plates together, inner projections have been pressed into the plates and the projections are then spot-welded together. Such a spot weld, however, produces undesirable distortions. Further, a spot-welded guide bar will produce a tension when bent and a buckling when compressed of the plate parts between the welded spots, and a spot welded bar is not as resistive to bending stresses as is a continuously welded bar.

Instead of spot welding, pins or bolts have also been used to secure two side plates to a center member. Japanese Pat. Pub. No. 55-15281 published on Apr. 22, 1980, which claims priority from U.S. patent application Ser. No. 741,550, filed on Nov. 15, 1976, discloses a saw chain guide bar wherein both side plates and a center plate are bolted together.

In addition, Harada et al. U.S. Pat. No. 4,138,813, dated Feb. 13, 1979, discloses another chain saw guide bar including two side plates. Each side plate is formed, as by pressing, with an inner ridge which extends adjacent its periphery. The ridges of the side plates are secured together to form a guide groove for a chain without the necessity of a center plate, thereby reducing the overall weight.

It is known to those skilled in the laser welding art that a laser weld fuses deeply and very narrowly into the metal. FIG. 1 illustrates the relationship between the depth of fusion and the width of the weld when welding 1018 steel using a 1.5 KW $CO_2$ laser. As can be seen from FIG. 1, a fusion deeper than 2 millimeters for a weld width of about 1 millimeter is available at an optimum distance between the metal surface and the laser beam generator. In addition a laser can completely weld some kinds of metal with little distortion produced.

It is therefore a general object of this invention to provide an improved three-plate guide bar having a simple and light weight construction, and a simple method of making such a bar.

A guide bar in accordance with this invention includes two similar side plates and a center plate which have overlapping portions. The center plate has a peripheral edge which is spaced from the peripheral edges of the side plates, thereby forming a chain saw guide groove between the edges of the side plates. The overlapping portions of the three plates are laser welded together, a continuous weld seam or path being formed substantially adjacent the peripheral edge of the center plate.

The method of construction of the bar includes forming the three plates and assembling them in stacked relation, and laser welding the plates together.

Preferred embodiments of this invention are described below with reference to the accompanying figures of the drawings, wherein:

FIG. 1 illustrates the depth of fusion and the width of a laser weld as functions of the distance, in millimeters, of the laser generator from the metal surface. The curve d represents the depth while the curve w represents the width.

Figure 2:
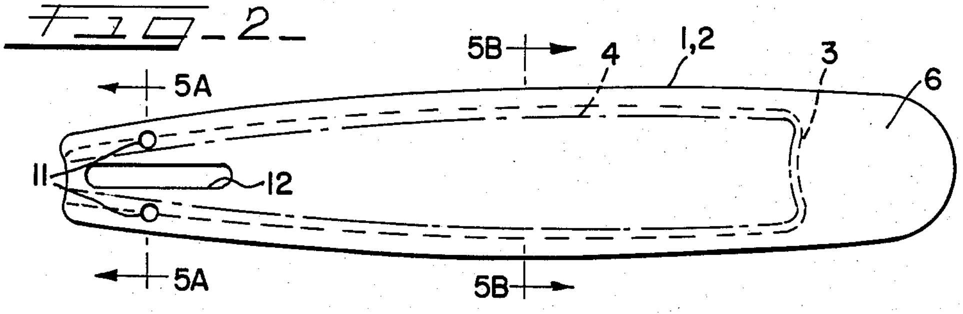
FIGS. 2, 3 and 4 are side views of three guide bars constructed according to this invention.
Figure 5A:
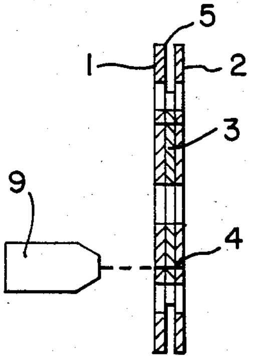
FIGS. 5A and 5B, 6C and 6D and 7E and 7F are sectional views taken on the lines 5A—5A and 5B—5B in FIG. 2, lines 6C—6C and 6D—6D in FIG. 3, and lines 7E—7E and 7F—7F in FIG. 4, respectively.
Figure 5B:
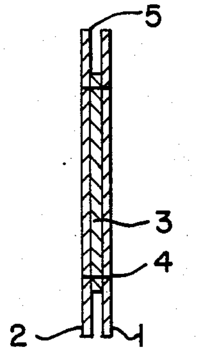
Figure 6D:
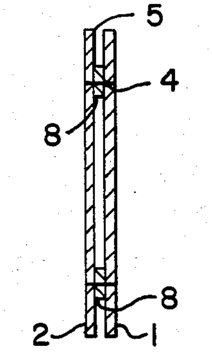

With reference to FIGS. 2, 5A and 5B, a bar in accordance with this invention includes a pair of side plates 1 and 2 and a sandwich or center plate 3 between them. The outline of the center plate 3 is shown by the dashed line in FIG. 2, and it has a smaller length and width than the two side plates which are substantially identical. The three plates are welded together by a laser 9 (FIG. 5A) substantially continuously along the dash-dot line 4 in FIG. 2. The weld line is discontinued only at the rearward (toward the left as soon in FIG. 2) end of the bar. The smaller dimensions of the center plate 3 forms a channel 5 for a conventional saw chain (not shown) between the edges of the side plates 1 and 2. The weld line 4 extends closely adjacent and substantially around the periphery of the center plate 3. In this embodiment of the invention, the forward end portion (the right-hand end) of the center plate 3 is recessed to provide space between the side plates 1 and 2 to receive a sprocket (not shown) at the forward end of the bar.

The rearward end portion of the bar is provided with holes 11 and a slot 12 for attaching the bar to a conventional chain saw frame (not shown).

Figure 3:
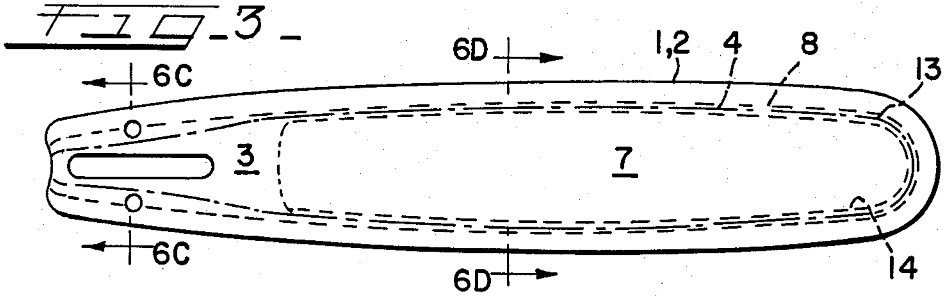
Figure 6C:
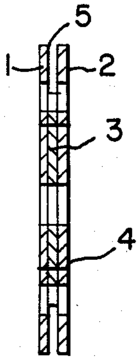

FIGS. 3, 6A and 6B show a modification wherein a center plate 3 has a forward end 13 generally corresponding in outline to that of the side plates 1 and 2. The central portion 7 of the center plate 3 is removed along an inner edge 14 to lighten the guide bar. The forward part of the center plate 3 thus forms a narrow band 8, and the laser weld line 4 is at approximately the center of the band 8. Rearwardly of the central portion 7, the weld line 4 extends to the rearward end of the bar.

Figure 4:
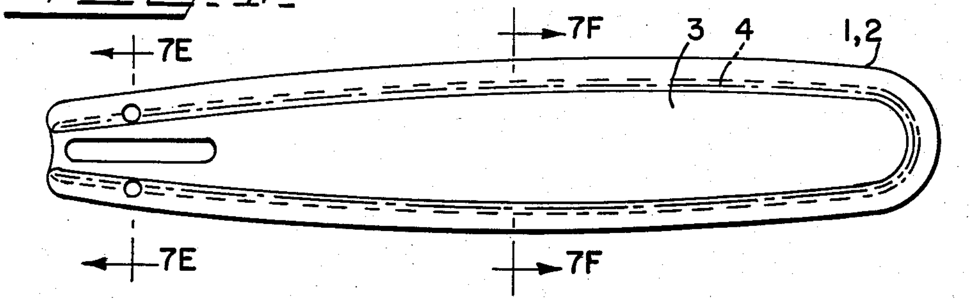
Figure 7E:
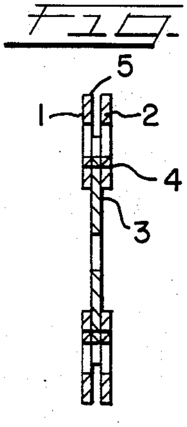
Figure 7F:
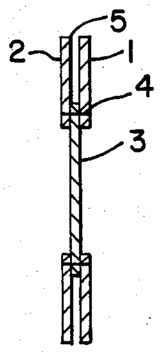

FIGS. 4, 7E and 7F show another form of the invention, wherein a pair of generally U-shaped narrow side members 1 and 2 extend around the outer edge of a center plate 3. The side members overlap with and are welded to the plate 3 by a laser along the line 4, again forming a peripheral channel 5 between the side members 1 and 2. The U-shape of the side members, of course, lightens the guide bar.

Figure 1:
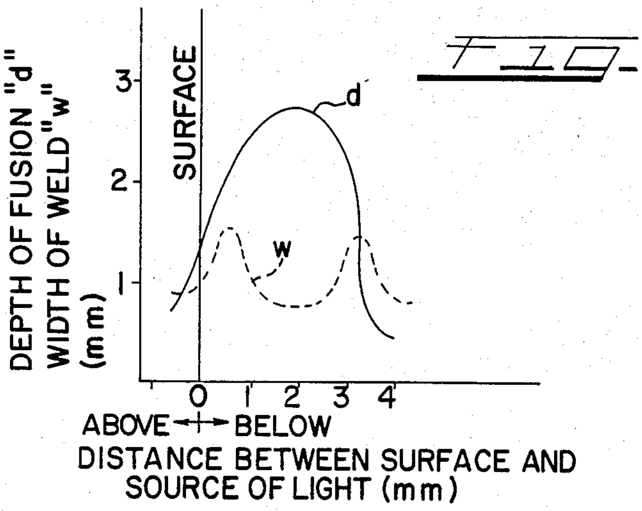
FIG. 1 is a chart showing certain characteristics of laser welding.

A chain saw bar according to the invention is constructed by first forming the three bars 1, 2 and 3 in one of the illustrated configurations. The three plates are then stacked in side-by-side arrangement and held together as by clamping them. The stacked plates are then positioned closely adjacent the laser generator 9. With the generator energized, either the generator or the plates are moved to form a continuous weld line closely adjacent the peripheral edge of the center plate 3. The power of the laser and the distance to the plates is, of course, adjusted to obtain the necessary depth of fusion, as illustrated in FIG. 1, taking into account the thicknesses of the plates.

The approximate overall thickness of the three plates is, for example, 4–6 mm, and the plates may have equal thicknesses. The center plate is preferably made of a relatively soft steel and each of the outer plates is preferably made of a composite of a soft steel layer and a harder steel layer, the soft steel layers engaging the center plate.

Normally both sides of the bar are subjected to the laser beam; however, if the bar thickness is relatively thin, the laser may be used on one side only of the bar.

If a three-plate guide bar having a substantially continuous laser weld according to this invention is deformed during use, it can usually be straightened using a hammer more easily than is the case with prior art bar. Further, the present bar has a higher section modulus and is more resistant to bending stresses than is a two-plate prior art bar having pressed parts.

I claim:

1. A guide bar for a chain saw, comprising two similar side plates and a center plate, said center plate and said side plates having peripheral edges and said side plates overlapping said edge of said center plate, portions of said center plate being flat against portions of said side plates, said center plate peripheral edge being spaced from the peripheral edges of the side plates over a substantial portion of the circumference of said center plate, said spacing forming a chain saw guide groove between the edges of the side plates and said center plate having a thickness that is substantially equal to the width of said guide groove, and a laser weld seam through said overlapping portions of said side and center plates closely adjacent said chain saw guide groove and the peripheral edge of said center plate, said seam forming a substantially continuous narrow weld seam substantially laterally through said side and center plates, said bar having a rearward mounting portion and a forward portion, and in said forward portion said center plate having an opening formed centrally thereof, said opening forming a band, and said laser weld seam extending through said band.

2. A guide bar for a chain saw, comprising two similar side plates and a center plate, said center plate and said side plates having peripheral edges and said side plates overlapping said edge of said center plate, portions of said center plate being flat against portions of said side plates, said center plate peripheral edge being spaced from the peripheral edges of the side plates over a substantial portion of the circumference of said center plate, said spacing forming a chain saw guide groove between the edges of the side plates and said center plate having a thickness that is substantially equal to the width of said guide groove, and a laser weld seam through said overlapping portions of said side and center plates closely adjacent said chain saw guide groove and the peripheral edge of said center plate, said seam forming a substantially continuous narrow weld seam substantially laterally through said side and center plates, said bar having a rearward mounting portion and a forward portion, and in said forward portion each of said side plates having an opening formed centrally thereof, said opening forming a band, and said laser weld seam extending through said band.

3. A guide bar for a chain saw made by the process comprising forming two substantially identical side plates, forming a center plate having an outer edge and smaller dimensions than said side plates, stacking said plates together with said center plate positioned between said side plates, said center plate having portions which lie flat against portions of said side plates and said side plates overlapping said outer edge of said center plate, said smaller dimensions of said center plate forming a chain saw guide groove between said side plates and the thickness of said center plate being substantially equal to the width of said guide groove, and laser welding said plates together in a substantially continuous narrow seam that extends through said side and center plates substantially laterally of said plates and is closely adjacent said guide groove and the outer edge of said center plate, and forming a central opening in said center plate to form a band before stacking said plates.

4. A guide bar for a chain saw made by the process comprising forming two substantially identical side plates, forming a center plate having an outer edge and smaller dimensions than said side plates, stacking said plates together with said center plate positioned between said side plates, said center plate having portions which lie flat against portions of said side plates and said side plates overlapping said outer edge of said center plate, said smaller dimensions of said center plate forming a chain saw guide groove between said side plates and the thickness of said center plate being substantially equal to the width of said guide groove, and laser welding said plates together in a substantially continuous narrow seam that extends through said side and center plates substantially laterally of said plates and is closely adjacent said guide groove and the outer edge of said center plate, and forming a central opening in each of said side plates to form a band before stacking said plates.

* * * * *